United States Patent
Chen et al.

(10) Patent No.: US 11,729,742 B2
(45) Date of Patent: Aug. 15, 2023

(54) NODES AND METHODS FOR HANDLING PAGING

(71) Applicant: Telefonaktiebolaget LM Ericsson (publ), Stockholm (SE)

(72) Inventors: Qian Chen, Mölndal (SE); Stefan Rommer, Västra Frölunda (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 14 days.

(21) Appl. No.: 16/753,717

(22) PCT Filed: Oct. 5, 2018

(86) PCT No.: PCT/EP2018/077198
§ 371 (c)(1),
(2) Date: Apr. 3, 2020

(87) PCT Pub. No.: WO2019/068898
PCT Pub. Date: Apr. 11, 2019

(65) Prior Publication Data
US 2020/0267689 A1 Aug. 20, 2020

Related U.S. Application Data

(60) Provisional application No. 62/568,833, filed on Oct. 6, 2017.

(51) Int. Cl.
*H04W 68/02* (2009.01)
*H04W 76/27* (2018.01)
(Continued)

(52) U.S. Cl.
CPC ............. *H04W 68/02* (2013.01); *H04W 8/08* (2013.01); *H04W 48/16* (2013.01); *H04W 68/005* (2013.01); *H04W 76/27* (2018.02)

(58) Field of Classification Search
CPC ... H04W 68/02; H04W 68/005; H04W 76/27; H04W 8/08; H04W 48/16
See application file for complete search history.

(56) References Cited

U.S. PATENT DOCUMENTS

| 6,181,933 B1 | 1/2001 | Jeong |
| 2003/0143999 A1 | 7/2003 | Funato et al. |

(Continued)

FOREIGN PATENT DOCUMENTS

| CN | 101159989 A | 4/2008 |
| CN | 102202394 A | 9/2011 |

(Continued)

OTHER PUBLICATIONS

International Search Report and Written Opinion dated Aug. 14, 2019 issued in International Application No. PCT/EP2018/077198. (8 pages).

(Continued)

*Primary Examiner* — Wayne H Cai
(74) *Attorney, Agent, or Firm* — Rothwell, Figg, Ernst & Manbeck, P.C.

(57) ABSTRACT

Embodiments herein relate generally to a Control plane, CP, node, a method performed by the CP node, a Radio Access Network, RAN, node and a method performed by the RAN node. More particularly the embodiments herein relate to handling paging.

19 Claims, 8 Drawing Sheets

(51) Int. Cl.
*H04W 8/08* (2009.01)
*H04W 48/16* (2009.01)
*H04W 68/00* (2009.01)

(56) References Cited

U.S. PATENT DOCUMENTS

| | | | |
|---|---|---|---|
| 2007/0027842 A1 | 2/2007 | Lambert | |
| 2013/0097291 A1 | 4/2013 | Afergan et al. | |
| 2014/0036873 A1* | 2/2014 | Cheng | H04W 36/0033 370/331 |
| 2015/0009874 A1* | 1/2015 | Edara | H04W 76/28 370/311 |
| 2018/0213556 A1* | 7/2018 | Rico Alvarino | H04W 74/004 |
| 2018/0317201 A1* | 11/2018 | Cha | H04W 72/1242 |
| 2019/0306829 A1 | 10/2019 | Abedin et al. | |
| 2021/0168695 A1* | 6/2021 | Ryu | H04W 4/02 |

FOREIGN PATENT DOCUMENTS

| | | |
|---|---|---|
| CN | 104718788 A | 6/2015 |
| CN | 106304336 A | 1/2017 |
| CN | 106793169 A | 5/2017 |
| CN | 107079234 A | 8/2017 |
| EP | 1 533 970 A1 | 5/2005 |
| JP | 2003-143643 A | 5/2003 |
| JP | 2015-526997 A | 9/2015 |
| WO | 2014/015995 A1 | 1/2014 |
| WO | 2015/113698 A1 | 8/2015 |

OTHER PUBLICATIONS

3GPP TS 23.501 V1.4.0 (Sep. 2017); 3rd Generation Partnership Project; Technical Specification Group Services and System Aspects; System Architecture for the 5G System; Stage 2 (Release 15). (151 pages).

Ericsson, "Additional paging information for RRC inactive state", SA WG2 Meeting #123; S2-178076; Oct. 27, 2017, Ljubljana, SI. (4 pages).

LG Electronics Inc., "Discussion on paging assistance information in RRC-inactive state", 3GPP TSG-RAN WG3 Meeting #NR AdHoc; R3-172265; Qingdao, P.R. China, Jun. 29, 2017. (4 pages).

Qualcomm Incorporated, P-CR to 23.501 on SA2 impacts of RRC inactive mode and RAN paging, SA WG2 Meeting #119; S2-170916; Feb. 17, 2017, Dubrovnik. (5 pages).

Ericsson, "Signalling flows for paging and resume for RRC_Inactive", Tdoc R2-1700536, 3GPP TSG-RAN WG2-AH, Spokane, Washington, U.S., Jan. 19, 2017. (7 pages).

Qualcomm Incorporated, "Network triggered service request procedure", SA WG2 Meeting #118bis, S2-170094, Spokane, WA, USA, Jan. 2017 (9 pages).

Catt, "Discussion on Comm of RAN Paging", 3GPP TSG-RAN WG3#97bis, R3-173611, Prague, Czech Republic, Oct. 2017 (6 pages).

Huawei, HiSilicon, S2-176173, "TS 23.502 clarification for parameters of DNN," 3G PP TSG SA WG2 Meeting #122B, Aug. 21-25, 2017, Sophia Antipolis, France, 11 pages.

LG Electronics Inc., "TP for UE-AMBR derivation in RAN in NG procedures," 3GPP TSG-RAN WG3 Meeting NR Adhoc, R3-172382, Qingdao, China, May 27, 2017-May 29, 2017, 20 pages.

Huawei et al., "Discussion on SA2 required work on Light Connection", SA WG2 Meeting #118bis, S2-170051, Jan. 16-20, 2017, Spokane, Washington, USA (8 pages).

WCDMA, "Synchronization Research for 3G Mobile Communication Network WCDMA NodeB", Beijing University, Apr. 4, 2006 (73 pages).

\* cited by examiner

NODES AND METHODS FOR HANDLING PAGING

CROSS REFERENCE TO RELATED APPLICATION(S)

This application is a 35 U.S.C. § 371 National Stage of International Patent Application No. PCT/EP2018/077198, filed Oct. 5, 2018, designating the United States and claiming priority to U.S. provisional application No. 62/568,833, filed on Oct. 6, 2017. The above identified applications are incorporated by reference.

TECHNICAL FIELD

Embodiments herein relate generally to a Control plane (CP) node, a method performed by the CP node, a Radio Access Network (RAN) node and a method performed by the RAN node. More particularly the embodiments herein relate to handling paging.

BACKGROUND

According to the current 3GPP TS 23.501 V1.4.0 (2017-09), the 5G System architecture is defined to support data connectivity and services enabling deployments to use techniques such as e.g. Network Function Virtualization (NFV) and Software Defined Networking (SDN). The 5G System architecture shall leverage service-based interactions between Control Plane (CP) Network Functions where identified. One key feature of 5G is to separate the User Plane (UP) functions from the Control Plane (CP) functions, allowing independent scalability, evolution and flexible deployments e.g. centralized location or distributed (remote) location.

Figure 1:
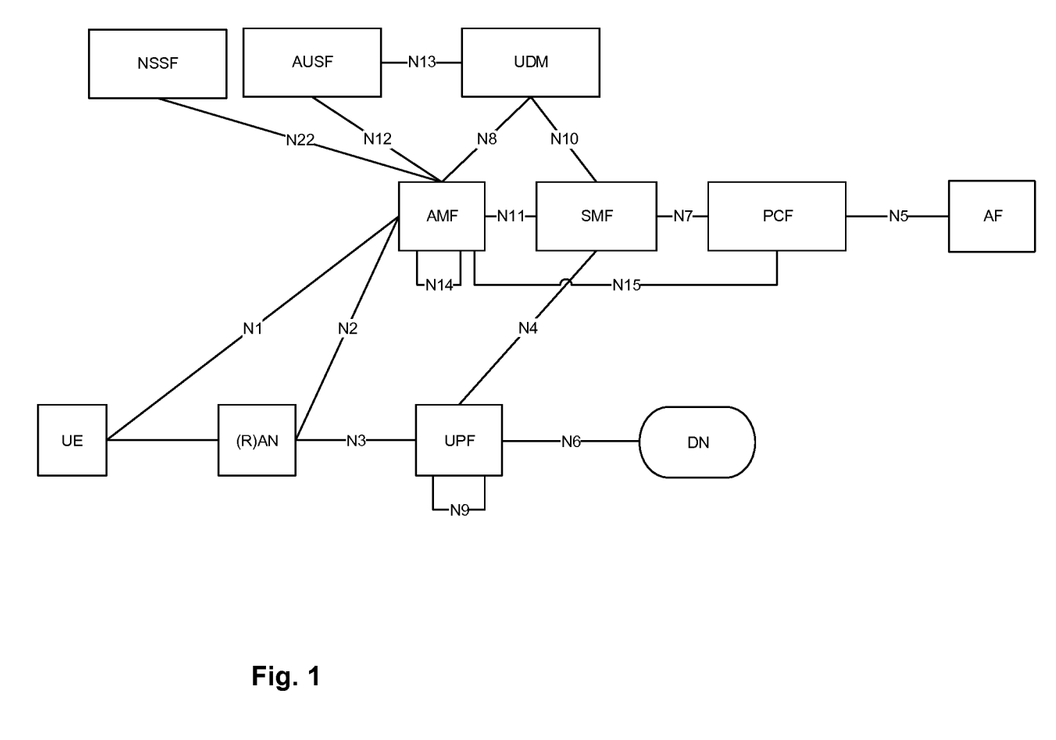
FIG. 1 is a schematic drawing illustrating an example embodiment of a 5G system.
Figure 2:
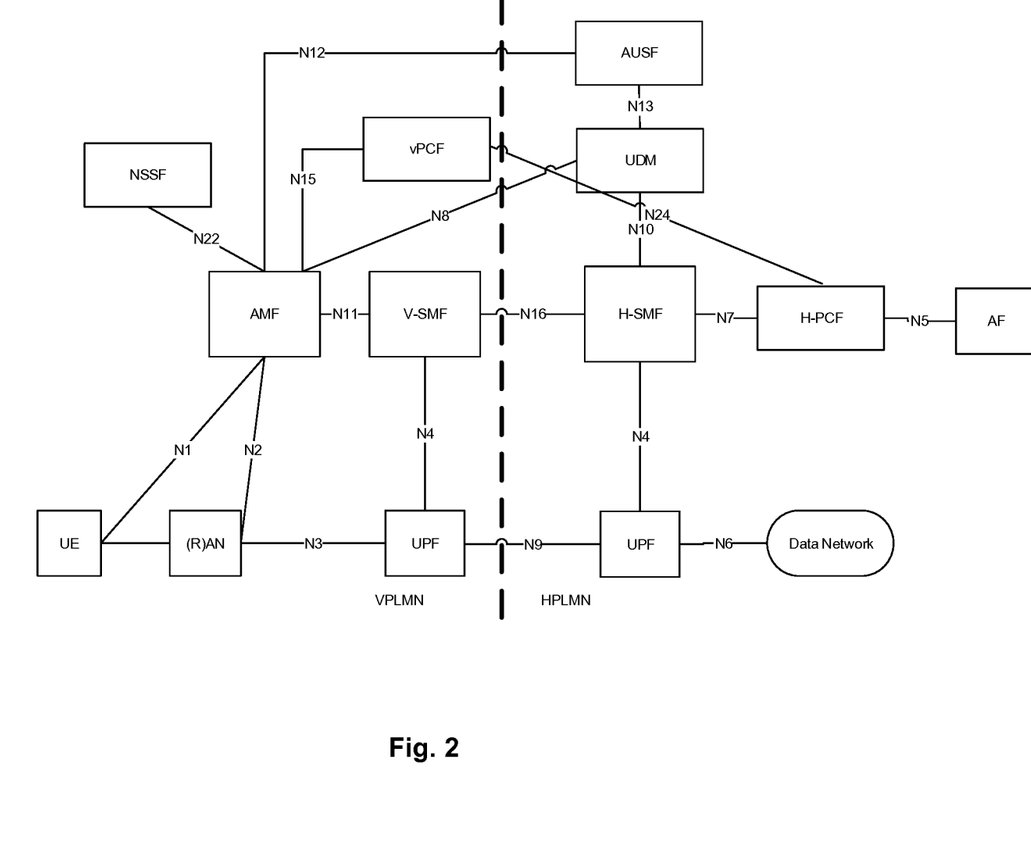
FIG. 2 is a schematic drawing illustrating an example embodiment of a 5G system.

FIG. 1 and FIG. 2 illustrate examples of the architecture for a 5G system. The 5G architecture is service-based and comprises network functions which interact with each other. FIG. 1 illustrates a non-roaming 5G System Architecture and FIG. 2 illustrates a Roaming 5G System architecture-Home routed scenario. The interfaces or reference points between the network functions in FIGS. 1 and 2 may be referred to as service-based interfaces.

The example architectures in FIGS. 1 and 2 comprise at least some of the following entities:
- Authentication Server Function (AUSF)
- Access and Mobility Management Function (AMF)
- Data Network (DN), e.g. operator services, Internet access or 3rd party services
- Unstructured Data Storage Function (UDSF)
- Network Exposure Function (NEF)
- NF Repository Function (NRF)
- Network Slice Selection Function (NSSF)
- Policy Control function (PCF)
- Session Management Function (SMF)
- Unified Data Management (UDM)
- Unified Data Repository (UDR)
- User plane Function (UPF)
- Application Function (AF)
- User Equipment (UE)
- (Radio) Access Network ((R)AN)
- 5G-Equipment Identity Register (5G-EIR)

The example 5G system architectures in FIGS. 1 and 2 comprise at least one of the following service-based interfaces:
- Namf: Service-based interface exhibited by AMF.
- Nsmf: Service-based interface exhibited by SMF.
- Nnef: Service-based interface exhibited by NEF.
- Npcf: Service-based interface exhibited by PCF.
- Nudm: Service-based interface exhibited by UDM.
- Naf: Service-based interface exhibited by AF.
- Nnrf: Service-based interface exhibited by NRF.
- Nnssf: Service-based interface exhibited by NSSF.
- Nausf: Service-based interface exhibited by AUSF.
- Nudr: Service-based interface exhibited by UDR.
- Nudsf: Service-based interface exhibited by UDSF.
- N5g-eir: Service-based interface exhibited by 5G-EIR.

The example 5G system architectures in FIGS. 1 and 2 comprise at least one of the following reference points:
- N1: Reference point between the UE and the AMF.
- N2: Reference point between the (R)AN and the AMF.
- N3: Reference point between the (R)AN and the UPF.
- N4: Reference point between the SMF and the UPF.
- N6: Reference point between the UPF and a Data Network.
- N9: Reference point between two UPFs.
- N5: Reference point between the PCF and an AF.
- N7: Reference point between the SMF and the PCF.
- N24: Reference point between the PCF in the visited network and the PCF in the home network.
- N8: Reference point between the UDM and the AMF.
- N10: Reference point between the UDM and the SMF.
- N11: Reference point between the AMF and the SMF.
- N12: Reference point between AMF and AUSF.
- N13: Reference point between the UDM and Authentication Server function the AUSF.
- N14: Reference point between two AMFs.
- N15: Reference point between the PCF and the AMF in case of non-roaming scenario, PCF in the visited network and AMF in case of roaming scenario.
- N16: Reference point between two SMFs, (in roaming case between SMF in the visited network and the SMF in the home network).
- N17: Reference point between AMF and 5G-EIR.
- N18: Reference point between any NF and UDSF.
- N22: Reference point between AMF and NSSF.
- N27: Reference point between NRF in the visited network and the NRF in the home network.

The current 3GPP TS 23.501 V1.4.0 (2017-09) has introduced the Radio Resource Control (RRC) inactive state. 5GC shall provide the RAN with RRC inactive assistance information.

There are two Connection Management (CM) states which are used to reflect the NAS signalling connectivity of the UE with the AMF:
- CM-IDLE
- CM-CONNECTED A UE in CM-CONNECTED state has a NAS signalling connection with the AMF over the N1 reference point. When a UE is in e.g. CM-CONNECTED state, it can also be in RRC Inactive state. When in RRC Inactive state, at least one of the following applies:
- The UE reachability is managed by the RAN, with assistance information from the core network, and/or
- The UE paging is managed by the RAN, and/or
- The UE monitors for paging with the UE's CN (5G S-TMSI) and the RAN identifier.

3GPP TS 23.501 V1.4.0 (2017-09) discloses the following in sections 5.3.3.2.5, 5.4.2 and 5.4.6 regarding CM-CONNECTED with RRC Inactive state, UE reachability in CM-CONNECTED and Core Network assisted RAN parameters tuning:

CM-CONNECTED with RRC Inactive State

The RRC Inactive state applies to Next Generation-RAN (NG-RAN) (i.e. it applies to New Radio (NR) and E-UTRA connected to 5G CN).

The AMF, based on network configuration may provide assistance information to the NG RAN, to assist the NG RAN's decision whether the UE can be sent to RRC Inactive state. The UE may provide indication of support for RRC inactive state on NAS or AS layer.

The "RRC Inactive assistance information" comprises at least one of the following information:
 UE specific DRX values, and/or
 The Registration Area provided to the UE, and/or
 Periodic Registration Update timer, and/or
 If the AMF has enabled MICO mode for the UE, an indication that the UE is in MICO mode.

The RRC Inactive assistance information mentioned above is provided by the AMF during N2 activation with the (new) serving NG RAN node (i.e. during Registration, service request, handover) to assist the NG RAN's decision whether the UE can be sent to RRC Inactive state. RRC Inactive is part of a RRC state machine, and it is up to the RAN to determine the conditions to enter RRC Inactive state. If any of the parameters included in the RRC Inactive Assistance Information changes as the result of NAS procedure, the AMF shall update the RRC Inactive Assistance Information to the NG RAN node. When the UE is in CM-CONNECTED state, if the AMF has provided RRC Inactive assistance information, the RAN node may decide to move a UE to CM-CONNECTED with RRC Inactive state.

The state of the N2 and N3 reference points are not changed by the UE entering CM-CONNECTED with RRC Inactive state. A UE in RRC inactive state is aware of the RAN Notification area.

With the introduction of RRC inactive state, the UE reachability management is also moved down to RAN side in this state.

UE Reachability in CM-CONNECTED
 For a UE in CM-CONNECTED state:
  The AMF knows the UE location on a serving (R)AN node granularity, and/or
  The NG-RAN notifies the AMF when UE becomes unreachable from a RAN point of view.

UE RAN reachability management is used by the RAN for UEs in RRC Inactive state. The location of a UE in RRC Inactive state is known by the RAN on a RAN Notification area granularity. A UE in RRC Inactive state is paged in cells of the RAN Notification area that is assigned to the UEs. The RAN Notification area can be a subset of cells configured in UE's Registration Area or all cells configured in the UE's Registration Area. The UE in RRC Inactive state performs Paging Area Update when entering a cell that is not part of the RAN Notification area that is assigned to the UE.

At transition into RRC Inactive state, the RAN configures the UE with a periodic RAN Notification Area Update timer value and the timer is restarted in the UE and in the RAN with this initial timer value. After the expiry of the periodic RAN Notification Area Update timer in the UE, the UE in RRC Inactive state performs periodic RAN Notification Area Update.

To aid the UE reachability management in the AMF, upon the expiry of the periodic RAN Notification Area Update timer in RAN, the RAN shall start an RRC release timer. If the RRC release timer expires, the RAN shall initiate the UE context release in the AN procedure.

The current 3GPP TS 23.501 V1.4.0 (2017-09) also indicated that some parameters may be provided by the 5GC to the RAN (see text below). However, this currently defined information (i.e. expected UE activity behaviour and expected HO behaviour) is not really related to the RAN paging.

Core Network Assisted RAN Parameters Tuning

The Core Network assisted RAN parameters tuning aids the RAN to minimize the UE state transitions and achieve optimum network behaviour. How the RAN uses the CN assistance information is not defined.

The CN assistance information may be derived by the AMF per UE in the AMF based on collection of UE behaviour statistics and/or other available information about the expected UE behaviour (such as subscribed DNN, SUPI ranges, or other information). If the communication pattern parameters of the UE are available, the AMF may use this information for selecting the CN assisted RAN parameter values. If the AMF is able to derive the Mobility Pattern of the UE, the AMF may take the Mobility Pattern information into account when selecting the CN assisted RAN parameter values.

The communication pattern parameters and the Mobility Pattern information are used by the AMF as input to derive the CN-assisted RAN parameter values. The communication pattern parameters can be provisioned by external party via the NEF. For the case of statistics-based CN assistance information collection, this may be enabled based on local configuration (e.g. subscribed DNN, SUPI ranges or other subscription information).

The CN assistance information provides the RAN with a way to understand the UE behaviour for these aspects:
 "Expected UE activity behaviour", i.e. the expected pattern of the UE's changes between CM-CONNECTED and CM-IDLE states. This may be derived e.g. from the statistical information, or mobility pattern or from subscription information.
 "Expected HO behaviour", i.e. the expected interval between inter-RAN handovers. This may be derived by the AMF e.g. from statistical information, or the Mobility Pattern information of the UE or the subscription information.

The AMF decides when to send this information to the RAN as "Expected UE behaviour" carried in N2 signalling over the N2 interface.

The calculation of the CN assistance information, i.e. the algorithms used and related criteria, and the decision when it is considered suitable and stable to send to the RAN may be vendor specific.

SUMMARY

An objective of embodiments herein is therefore to obviate at least one of the above disadvantages and to provide improved paging.

According to a first aspect, the object is achieved by method performed by Control Plane, CP, node for handling paging. The CP node triggers that a User Equipment, UE, should be paged by the Access Network, AN, node. The CP node transmits, when triggered, paging assistance information to the AN node.

According to a second aspect, the object is achieved by a method performed by an AN node for handling paging. The AN node receives paging assistance information from a CP node. The AN node determines a paging strategy based on the received paging assistance information. The AN node pages the UE using the determined paging strategy.

According to a third aspect, the object is achieved by a CP node for handling paging. The CP node is adapted to trigger that a UE should be paged by an AN node, and to transmit, when triggered, paging assistance information to the AN node.

According to a fourth aspect, the object is achieved by an AN node for handling paging. The AN node is adapted to receive paging assistance information from a CP node. The AN node is adapted to determine a paging strategy based on the received paging assistance information, and to page the UE using the determined paging strategy.

Thanks to the paging assistance information, the AN node has detailed and relevant information in order to be able to determine the paging strategy, i.e. the paging is improved.

Embodiments herein afford many advantages, of which a non-exhaustive list of examples follows:

One advantage of the embodiments herein is that an optimized paging strategy can be formulated by Radio Access Network, RAN, based on its local info and information provided by 5GC in different procedures.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 3:
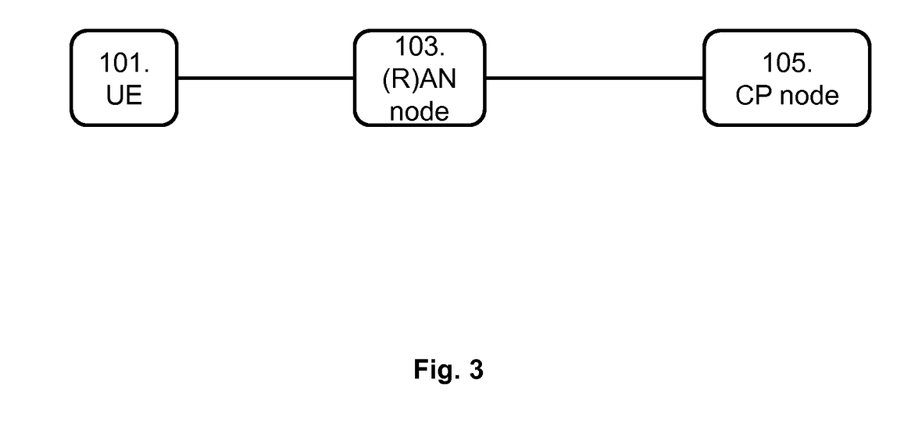
FIG. 3 is a schematic drawing illustrating an example embodiment of a communication system.

FIG. 3 is a schematic block diagram illustrating embodiments of a system in which the embodiments herein may be implemented. The system may in some embodiments apply to one or more radio access technologies such as for example Long Term Evolution (LTE), LTE Advanced, Wideband Code Division Multiple Access (WCDMA), Global System for Mobile Communications (GSM), 5G or any other Third Generation Partnership Project (3GPP) radio access technology, or other radio access technologies such as e.g. WLAN.

FIG. 3 illustrates a User Equipment, UE, 101 which is adapted to communicate with an Access Network (AN) node 103. The AN node 103 is adapted to communicate with a Control Plane, CP, node 105.

The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another device or a server.

The AN node 103 may be referred to as a (R)AN node, a RAN node, a base station, a NodeB, an eNodeB (eNB), a gNB, a RNC etc.

The CP node 105 may also be referred to as a CP function, a CP entity, a node implementing a CP function or any other suitable term for a unit in a control plane. The CP node 105 may be for example a 5G CP node. The CP node 105 may be an Access and Mobility Management Function, AMF or a Radio AMF (RAMF).

The communication system exemplified in FIG. 3 may comprise other entities than the ones illustrated, but the UE 101, the AN node 103 and the CP node 105 are only illustrated for the sake of simplicity. For example, the communications system may comprise at least one of the entities illustrated in FIGS. 1 and 2.

For the UE in RRC inactive state, RAN paging may be triggered in at least one of the following cases:

a) In case of downlink signaling, and/or
  b) In case of downlink data.

When the RAN paging (i.e. paging of the UE) is executed, a certain paging strategy will be defined by the RAN. However, the RAN does not have all the information related to the UE (e.g. Critical level of the MT signaling) or information related to the PDU session (e.g. DNN, the critical level of the service) when applying the paging strategy in both cases above. The current 3GPP standard has not addressed the issue yet.

According to the embodiments herein both static and dynamic paging assistance information is provided to the RAN in different procedures either at UE level or at PDU session level. At least part of the paging assistance information can be used by the RAN as input parameters when formulating a paging strategy when case a) and case b) happens for a UE in RRC in inactive state.

Static paging assistance information is static information when the UE context or the PDU session is established towards the RAN. It is valid for the live time of the UE context or the PDU session. Dynamic paging assistance information is formulated when the AMF indicates the critical level of the current activity, which shall only be used by the RAN for the current paging activity. The AMF formulates this information based on the input when the MT event happens (e.g. some priority information from other Network Functions (NF)).

Assistance information, also referred to as paging assistance information, paging information or inactive assistance information (these terms are used interchangeably herein) is transmitted from the 5GC to the RAN for a UE in RRC inactive state. The information is assistance information in the sense that it assists the AN node in determining the paging strategy. The paging assistance information may comprise at least one of the following parameters: Service priority information and/or paging priority information. The service priority information may comprise at least one of the following parameters:

Priority level (1-256, generated by the CP node (e.g. the AMF) based on different input), and/or
Attributes (dynamic (i.e. one time usage) vs. static), and/or
UE or PDU session level indication.

The paging priority information may correspond to the idle mode paging priority which much related to MPS priority service.

Figure 4:
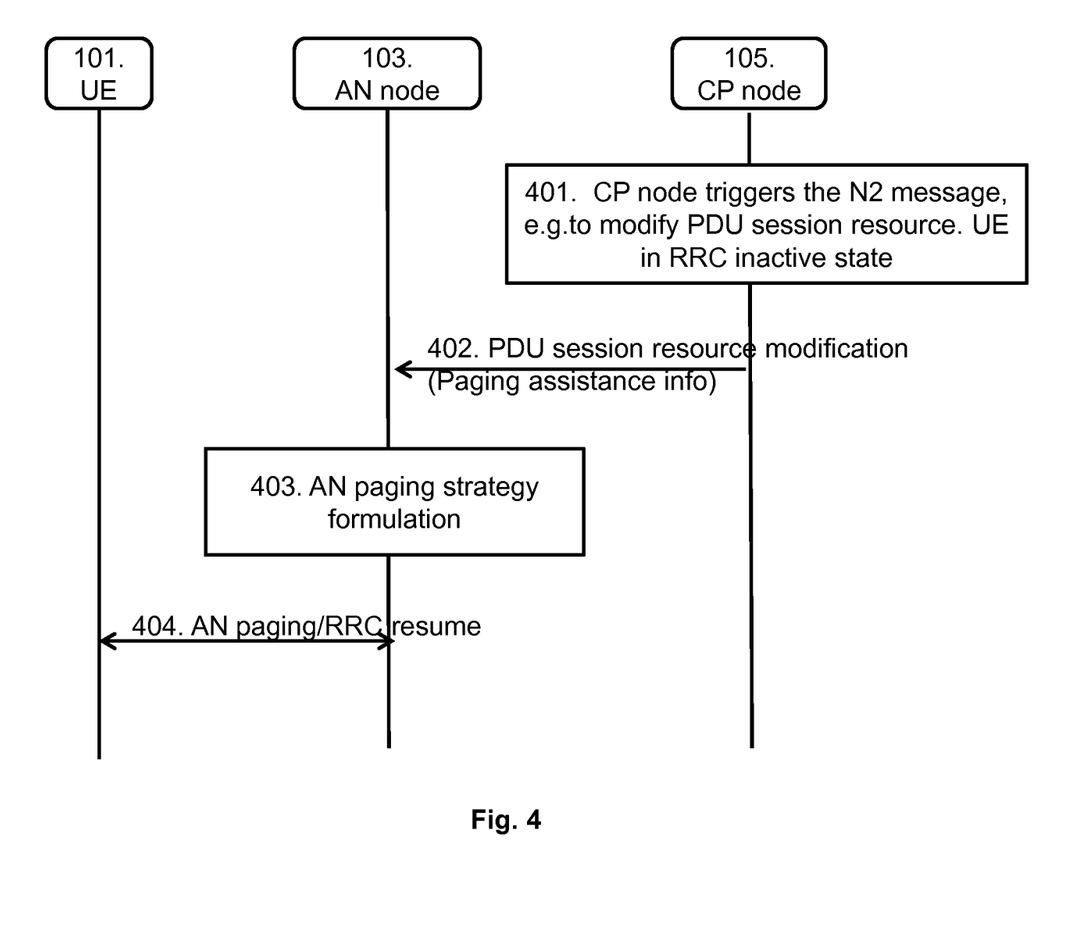
FIG. 4 is a signaling diagram illustrating embodiments of a method.

The paging assistance information may be provided from the AMF to the RAN in at least one of the following procedures:

PDU session establishment/modification, and/or
Downlink NAS transport, and/or
N2 UE context establishment/modification, and/or
HO preparation, and/or FIG. 4 is a signaling diagram illustrating embodiments of a method, with reference to the system in FIG. 3. The figure illustrates for example an embodiment of a paging assistance information delivery. The method illustrated in FIG. 4 comprises at least one of the following steps, which steps may be performed in any suitable order than described below:

Step 401

The CP node 105 triggers a message to be transmitted to the AN node 103. The message may be a N2 message. An N2 message is a message to be transmitted over a N2 reference point. The N2 reference point may be between the CP node 105 and the AN node 103. The message may comprise information indicating modification of a PDU session resource. The UE 101 is in RRC inactive state when this step is performed.

Step 402

The CP node 105 sends the triggered message to the AN node 103. The message may be a PDU session resource modification. The message comprises Paging assistance information. As mentioned above, the paging assistance information may comprise at least one of the following parameters: Service priority information and/or paging priority information. The service priority information comprises at least one of the following parameters:

Priority level (1-256, generated by AMF based on different input), and/or
Attributes (dynamic (i.e. one time usage) vs. static), and/or
UE or PDU session level indication.

The paging priority information may correspond to the idle mode paging priority which much related to MPS priority service.

The AN node 103 receives the message from the CP node 105.

Step 403

The AN node 103 formulates a paging strategy for paging the UE 101.

Step 404

The AN node 103 pages the UE 101 according to the strategy in step 403. In addition, a RRC resume procedure may also be initiated.

Figure 5:
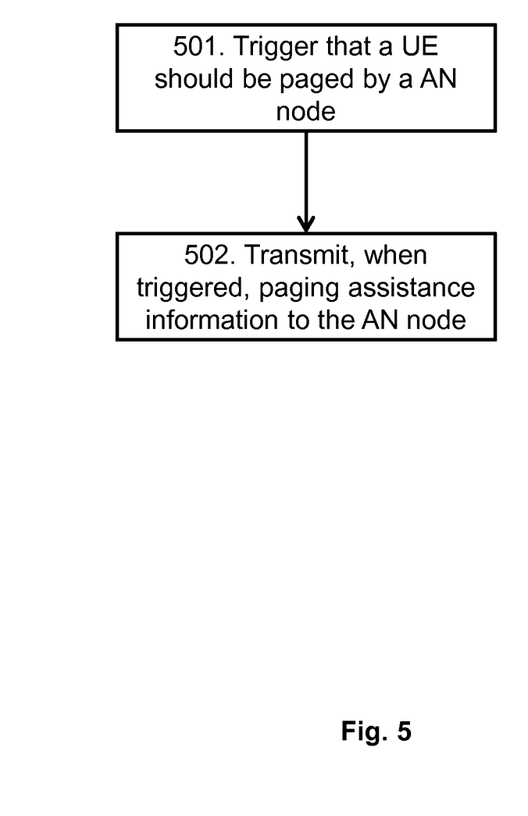
FIG. 5 is a flow chart illustrating embodiments of a method performed by a CP node.

The method described above will now be described seen from the perspective of CP node 105. FIG. 5 is a flowchart describing the present method performed by the CP node 105, for handing paging. The CP node 105 may be a 5G CP node. The CP node 105 may be an AMF. The method in FIG. 5 comprises at least one of the following steps to be performed by the CP node 105, which steps may be performed in any other suitable order than described below:

Step 501

This step corresponds to step 401 in FIG. 4. The CP node 105 triggers that a UE 101 should be paged by an AN node 103. The UE 101 may be in RRC inactive state. The UE 101 may be in CM-Connected state with RRC inactive state.

The AN paging may be triggered in case of at least one of:
downlink signaling and/or
downlink data.

Step 502

This step corresponds to step 402 in FIG. 4. The CP node 105 transmits, when triggered, paging assistance information to the AN node 103.

The paging assistance information may be transmitted to the AN node 103 in a message associated with at least one of the following procedures:

PDU session establishment/modification, and/or
Downlink NAS transport, and/or
N2 UE context establishment/modification, and/or
HO preparation.

The paging assistance information may comprise at least one of service priority information and/or paging priority information.

Service priority information comprised in the paging assistance information may comprise at least one of the following:

Priority level (1-256, generated by the CP node (105), based on different input), and/or
Attributes (dynamic (i.e. one time usage) vs static), and/or
UE or PDU session level indication.

The paging assistance information may comprise at least one of: static and/or dynamic paging assistance information.

The paging assistance information may be transmitted to the AN node 103 at UE level or at PDU session level.

Figure 6:
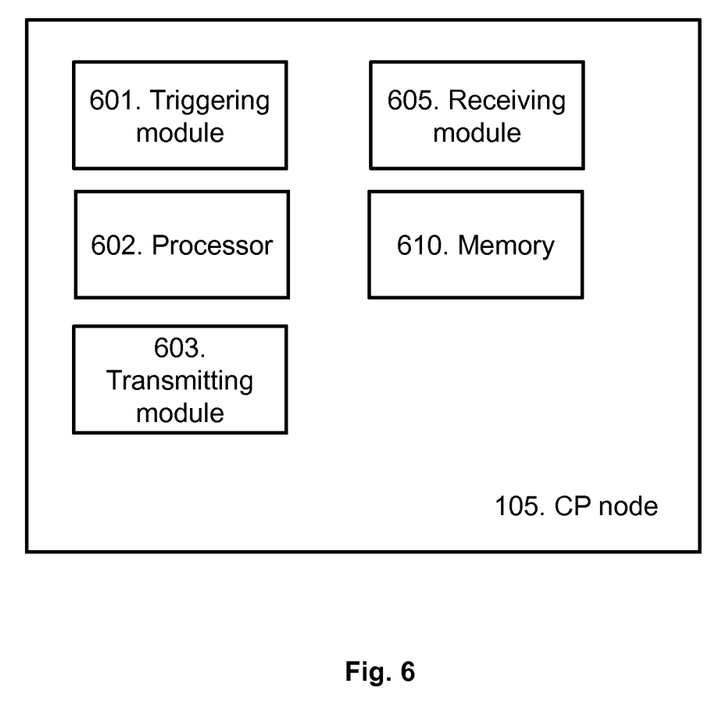
FIG. 6 is a flow chart illustrating embodiments of a method performed by an AN node.

To perform the method steps shown in FIG. 5 for handling paging, the CP node 105 may comprises an arrangement as shown in FIG. 6. The CP node may be a 5G CP node. The CP node may be an AMF.

The CP node 105 is adapted to, e.g. by means of a triggering module 601, trigger that a UE should be paged by an AN node. The UE may be in RRC inactive state. The UE may be in CM-Connected state with RRC inactive state. The triggering module 601 may be a processor 602 comprised in the CP node 105.

The AN paging may be triggered in case of at least one of:
downlink signaling and/or
downlink data.

The CP node is adapted to, e.g. by means of a transmitting module 603, transmit, when triggered, paging assistance information to the AN node.

The paging assistance information may be transmitted to the AN node in a message associated with at least one of the following procedures:

PDU session establishment/modification, and/or
Downlink NAS transport, and/or
N2 UE context establishment/modification, and/or
HO preparation.

The paging assistance information may comprise at least one of service priority information and/or paging priority information.

The service priority information comprised in the paging assistance information may comprise at least one of the following:

Priority level (1-256, generated by the CP node (105), based on different input), and/or Attributes (dynamic (i.e. one time usage) vs static), and/or UE or PDU session level indication.

The paging assistance information may comprise at least one of: static and/or dynamic paging assistance information.

The paging assistance information is transmitted to the AN node 103 at UE level or at PDU session level.

The CP node is adapted to, e.g. by means of a receiving module 605, receive information and messages from other entities in the system.

In some embodiments, the CP node comprises the processor 602 and a memory 610. The memory 610 comprises instructions executable by the processor 602.

The memory 610 comprises one or more memory units. The memory 610 is arranged to be used to store data, received data streams, signalling, data, priority information, paging assistance information, paging strategy, local information, threshold values, time periods, configurations, schedulings, and applications to perform the methods herein when being executed in the CP node.

In some embodiments, a computer program may comprise instructions which, when executed on at least one processor, cause the at least one processor to carry out the method steps in FIGS. 4 and 5. A carrier may comprise the computer program, and the carrier is one of an electronic signal, optical signal, radio signal or computer readable storage medium.

Figure 7:
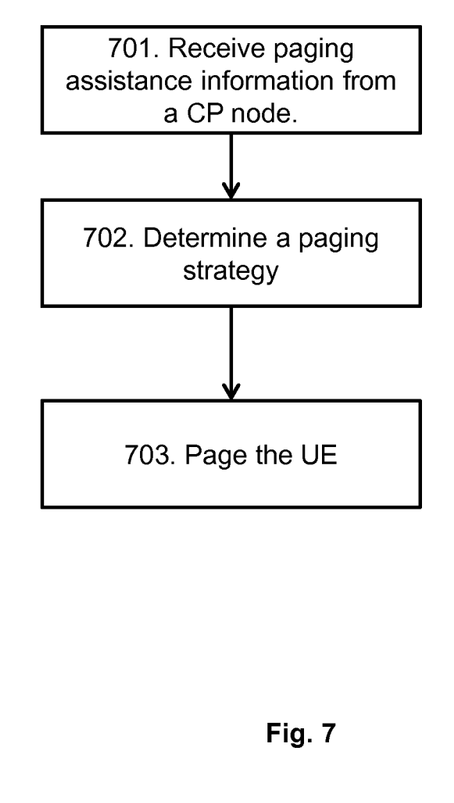
FIG. 7 is a schematic drawing illustrating embodiments of a CP node.

The method described above will now be described seen from the perspective of AN node 103. FIG. 7 is a flowchart describing the present method performed by the AN node for handing paging. The method in FIG. 7 comprises at least one of the following steps to be performed by the AN node 103, which steps may be performed in any other suitable order than described below:

Step 701

This step corresponds to step 402 in FIG. 4. The AN node 103 receives paging assistance information from a CP node.

Step 702

This step corresponds to step 403 in FIG. 4. The AN node 103 determines a paging strategy based on the received paging assistance information. The paging strategy may also be referred to as a paging method, a paging procedure, a paging routine etc.

A paging strategy relates to how the AN node executes the paging in terms of:
1) The scope of the paging area (e.g. from small area to a big area, or paging in big area immediately).
2) A paging timer (e.g. waiting for the RRC resume from UE as paging response).
3) A paging repetition handling (how many repetitions before giving up).

Step 703

This step corresponds to step 404 in FIG. 4. The AN node 103 pages the UE using the determined paging strategy.

Figure 8:
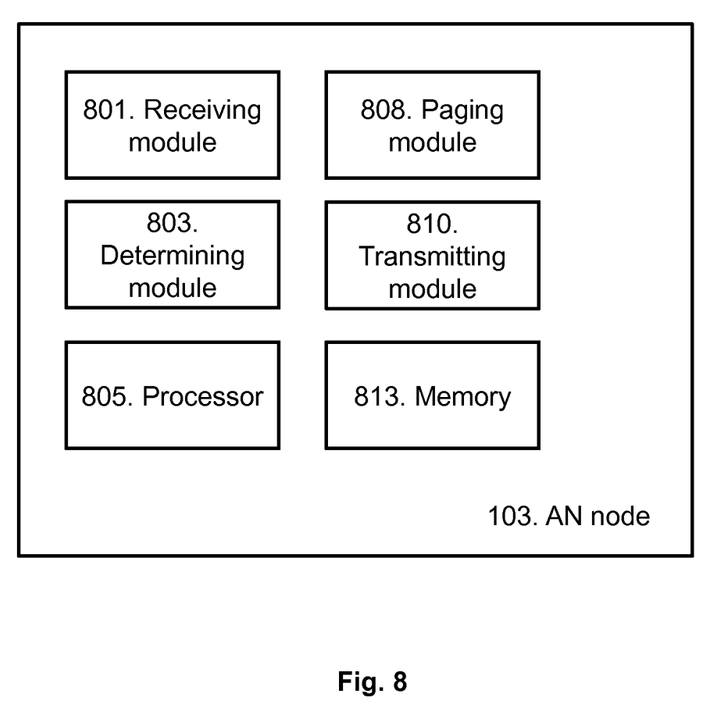
FIG. 8 is a schematic drawing illustrating embodiments of an AN node.

To perform the method steps shown in FIG. 7 for handling paging, the AN node 103 may comprises an arrangement as shown in FIG. 8.

The AN node is adapted to, e.g. by means of a receiving module 801, receive paging assistance information from a CP node. 34. The paging assistance information may be received by the AN node 103 in a message associated with at least one of the following procedures:

PDU session establishment/modification, and/or
Downlink NAS transport, and/or
N2 UE context establishment/modification, and/or
HO preparation.

The paging assistance information may comprise at least one of service priority information and/or paging priority information. The service priority information comprised in the paging assistance information may comprise at least one of the following:

Priority level (1-256, generated by the CP node (105), based on different input), and/or Attributes (dynamic (i.e. one time usage) vs static), and/or UE or PDU session level indication.

The paging assistance information may comprise at least one of: static and/or dynamic paging assistance information.

The paging assistance information may be received by the AN node 103 at UE level or at PDU session level.

The AN node is adapted to, e.g. by means of a determining module 803, determine a paging strategy based on the received paging assistance information. The determining module 803 may be a processor 805 comprised in the AN node 103. The paging strategy may be determined further based on local information comprised in the AN node.

The AN node is adapted to, e.g. by means of a paging module 808, page the UE using the determined paging strategy. 35. The UE 101 may be in RRC inactive state. The UE 101 may be in CM-Connected state with RRC inactive state.

The AN node is adapted to, e.g. by means of a transmitting module 810, transmit messages and information to other nodes in the system such as e.g. the UE and/or the CP node 105.

In some embodiments, the AN node comprises the processor 801 and a memory 813. The memory 813 comprises instructions executable by the processor 801.

The memory 813 comprises one or more memory units. The memory 813 is arranged to be used to store data, received data streams, signalling, data, priority information, paging assistance information, paging strategy, local information, threshold values, time periods, configurations, schedulings, and applications to perform the methods herein when being executed in the AN node.

In some embodiments, a computer program may comprise instructions which, when executed on at least one processor, cause the at least one processor to carry out the method steps in FIGS. 4 and 7. A carrier may comprise the computer program, and the carrier is one of an electronic signal, optical signal, radio signal or computer readable storage medium.

The present mechanism for handling paging may be implemented through one or more processors, such as a processor 602 in the CP node arrangement depicted in FIG. 6 and a processor 805 in the AN node arrangement depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into at least one of the CP node and/or the AN node. One such carrier may be in the form of a CD ROM disc. It is however feasible with other data carriers such as a memory stick. The computer program code can furthermore be provided as pure program code on a server and downloaded to at least one of the CP node and/or the AN node.

The embodiments herein relate to RRC Inactive State Paging Assistance information delivery.

The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasised that the steps of the methods may, without departing from the embodiments herein, be performed in another order than the order in which they appear.

EXAMPLE EMBODIMENTS

1. A method performed by a Control plane, CP, node (105), for handling paging, the method comprising:
triggering (401) that a UE (101) should be paged by a AN node (103); and
transmitting (402), when triggered, paging assistance information to the AN node (103).

2. The method according to any of the preceding embodiments, wherein the AN paging is triggered in case of at least one of:
downlink signaling and/or
downlink data.

3. The method according to any of the preceding embodiments, wherein the paging assistance information is transmitted to the AN node (103) in a message associated with at least one of the following procedures:
PDU session establishment/modification, and/or
Downlink NAS transport, and/or
N2 UE context establishment/modification, and/or
HO preparation.

4. The method according to any of the preceding embodiments, wherein the UE (101) is in RRC inactive state.

5. The method according to any of the preceding embodiments, wherein the UE (101) is in CM-Connected state with RRC inactive state.

6. The method according to any of the preceding embodiments, wherein the paging assistance information comprises at least one of service priority information and/or paging priority information.

7. The method according to any of the preceding embodiments, wherein service priority information comprised in the paging assistance information comprises at least one of the following:
Priority level (1-256, generated by the CP node (105), based on different input), and/or
Attributes (dynamic (i.e. one time usage) vs static), and/or
UE or PDU session level indication.

8. The method according to any of the preceding embodiments, wherein the paging assistance information comprises at least one of: static and/or dynamic paging assistance information.

9. The method according to any of the preceding embodiments, wherein the paging assistance information is transmitted to the AN node (103) at UE level or at PDU session level.

10. The method according to any of the preceding embodiments, wherein the CP node (105) is a 5G CP node.

11. The method according to any of the preceding embodiments, wherein the CP node (105) is an AMF.

12. A method performed by an Access Network, AN, node (103) for handling paging, the method comprising:
receiving (402) paging assistance information from a Control plane, CP, node (105);
determining (403) a paging strategy based on the received paging assistance information; and
paging (404) the UE (101) using the determined paging strategy.

13. The method according to any of the preceding embodiments, wherein the paging strategy is determined further based on local information comprised in the AN node (103).

14. The method according to any of the preceding embodiments, wherein the paging assistance information is received by the AN node (103) in a message associated with at least one of the following procedures:
PDU session establishment/modification, and/or
Downlink NAS transport, and/or
N2 UE context establishment/modification, and/or
HO preparation.

15. The method according to any of the preceding embodiments, wherein the UE (101) is in RRC inactive state.

16. The method according to any of the preceding embodiments, wherein the UE (101) is in CM-Connected state with RRC inactive state.

17. The method according to any of the preceding embodiments, wherein the paging assistance information comprises at least one of service priority information and/or paging priority information.

18. The method according to any of the preceding embodiments, wherein service priority information comprised in the paging assistance information comprises at least one of the following:
Priority level (1-256, generated by the CP node (105), based on different input), and/or
Attributes (dynamic (i.e. one time usage) vs static), and/or
UE or PDU session level indication.

19. The method according to any of the preceding embodiments, wherein the paging assistance information comprises at least one of: static and/or dynamic paging assistance information.

20. The method according to any of the preceding embodiments, wherein the paging assistance information is received by the AN node (103) at UE level or at PDU session level.

21. A Control plane, CP, node (105), for handling paging, the CP node (105 being adapted to:
trigger that a UE (101) should be paged by a AN node (103); and to
transmit, when triggered, paging assistance information to the AN node (103).

22. The CP node (105) according to any of the preceding embodiments, wherein the AN paging is triggered in case of at least one of:
downlink signaling and/or
downlink data.

23. The CP node (105) according to any of the preceding embodiments, wherein the paging assistance information is transmitted to the AN node (103) in a message associated with at least one of the following procedures:
  PDU session establishment/modification, and/or
  Downlink NAS transport, and/or
  N2 UE context establishment/modification, and/or
  HO preparation.

24. The CP node (105) according to any of the preceding embodiments, wherein the UE (101) is in RRC inactive state.

25. The CP node (105) according to any of the preceding embodiments, wherein the UE (101) is in CM-Connected state with RRC inactive state.

26. The CP node (105) according to any of the preceding embodiments, wherein the paging assistance information comprises at least one of service priority information and/or paging priority information.

27. The CP node (105) according to any of the preceding embodiments, wherein service priority information comprised in the paging assistance information comprises at least one of the following:
  Priority level (1-256, generated by the CP node (105), based on different input), and/or
  Attributes (dynamic (i.e. one time usage) vs static), and/or UE or PDU session level indication.

28. The CP node (105) according to any of the preceding embodiments, wherein the paging assistance information comprises at least one of: static and/or dynamic paging assistance information.

29. The CP node (105) according to any of the preceding embodiments, wherein the paging assistance information is transmitted to the AN node (103) at UE level or at PDU session level.

30. The CP node (105) according to any of the preceding embodiments, wherein the CP node (105) is a 5G CP node.

31. The CP node (105) according to any of the preceding embodiments, wherein the CP node (105) is an AMF.

32. An AN node (103) for handling paging, the AN node (103) being adapted to:
  receive paging assistance information from a Control plane, CP, node (105);
  determine a paging strategy based on the received paging assistance information; and to
  page the UE (101) using the determined paging strategy.

33. The AN node (103) according to any of the preceding embodiments, wherein the paging strategy is determined further based on local information comprised in the AN node (103).

34. The AN node (103) according to any of the preceding embodiments, wherein the paging assistance information is received by the AN node (103) in a message associated with at least one of the following procedures:
  PDU session establishment/modification, and/or
  Downlink NAS transport, and/or
  N2 UE context establishment/modification, and/or
  HO preparation.

35. The AN node (103) according to any of the preceding embodiments, wherein the UE (101) is in RRC inactive state.

36. The AN node (103) according to any of the preceding embodiments, wherein the UE (101) is in CM-Connected state with RRC inactive state.

37. The AN node (103) according to any of the preceding embodiments, wherein the paging assistance information comprises at least one of service priority information and/or paging priority information.

38. The AN node (103) according to any of the preceding embodiments, wherein service priority information comprised in the paging assistance information comprises at least one of the following:
  Priority level (1-256, generated by the CP node (105), based on different input), and/or
  Attributes (dynamic (i.e. one time usage) vs static), and/or UE or PDU session level indication.

39. The AN node (103) according to any of the preceding embodiments, wherein the paging assistance information comprises at least one of: static and/or dynamic paging assistance information.

40. The AN node (103) according to any of the preceding embodiments, wherein the paging assistance information is received by the RAN (103) at UE level or at PDU session level.

41. A system comprising a CP node (105) according to any one of embodiments 21-31 and an AN node (103) according to any one of embodiments 32-40.

42. A method performed by a system for handling paging, the method comprising:
  triggering (401), at a CP node (105), that a UE (101) should be paged by a AN node (103);
  transmitting (402), when triggered, paging assistance information from the CP node (105) to the AN node (103);
  receiving (402), at the AN node (103), paging assistance information from a Control plane, CP, node (105);
  determining (403), at the AN node (103), a paging strategy based on the received paging assistance information;
  paging (404), at the AN node (103), the UE (101) using the determined paging strategy; and
  detecting (404), at the UE (101) the paging from the AN node (103).

42. A computer program comprising instructions which, when executed on at least one processor, cause the at least one processor to carry out the method according to any one of embodiments 1-11.

43. A carrier comprising the computer program of embodiment 42, wherein the carrier is one of an electronic signal, optical signal, radio signal or computer readable storage medium.

44. A computer program comprising instructions which, when executed on at least one processor, cause the at least one processor to carry out the method according to any one of embodiments 12-20.

45. A carrier comprising the computer program of embodiment 44, wherein the carrier is one of an electronic signal, optical signal, radio signal or computer readable storage medium.

46. A computer program comprising instructions which, when executed on at least one processor, cause the at least one processor to carry out the method according to any one of embodiments 41.

47. A carrier comprising the computer program of embodiment 46, wherein the carrier is one of an electronic signal, optical signal, radio signal or computer readable storage medium.

The invention claimed is:
1. A method, the method comprising:
  a control plane (CP) node generating or receiving a message comprising paging assistance information; and
  the CP node transmitting the message comprising the paging assistance information toward an access network (AN) node, wherein the paging assistance information comprises paging priority information that indicates an importance of downlink signalling for a UE, and the message comprising the paging assistance information is a UE context modification message configured to cause the AN node to add the paging priority information to an established UE context associated with the UE.

2. The method according to claim 1, wherein the UE is in Radio Resource Control inactive state.

3. The method according to claim 1, wherein the UE is in Connection Management Connected state with RRC inactive state.

4. The method according to claim 1, the message comprising the paging assistance information further comprises a UE identifier and a protocol data unit (PDU) session identifier.

5. The method according to claim 1, wherein the CP node is an Access and Mobility Management Function.

6. The method of claim 1, further comprising:
the AN node receiving the message transmitted by the CP node;
the AN determining a paging strategy based on the paging assistance information included in the received message; and
the AN paging a User Equipment (UE) using the determined paging strategy.

7. A computer program product comprising a non-transitory computer readable medium storing a computer program comprising instructions which, when executed on at least one processor, cause the at least one processor to carry out the method according to claim 1.

8. A method performed by an Access Network (AN) node for handling paging, the method comprising:
receiving a message transmitted by a Control plane (CP) node, wherein the message comprises paging assistance information;
determining a paging strategy based on the received paging assistance information; and
paging a User Equipment (UE) using the determined paging strategy, wherein
the paging assistance information comprises paging priority information, and
the message comprising the paging assistance information is a UE context modification message configured to cause the AN node to add the paging priority information to an established UE context associated with the UE.

9. The method according to claim 8, wherein the paging strategy is determined further based on local information comprised in the AN node.

10. The method according to claim 8, wherein the UE is in Radio Resource Control inactive state.

11. The method according to claim 8, wherein the UE is in Connection Management Connected state with RRC inactive state.

12. The method according to claim 8, wherein the paging assistance information is received by the AN node at UE level or at PDU session level.

13. A computer program product comprising a non-transitory computer readable medium storing a computer program comprising instructions which, when executed on at least one processor, cause the at least one processor to carry out the method according to claim 8.

14. A Control plane (CP) node the CP node comprising:
memory; and
processing circuitry coupled to the memory, wherein the CP node is configured to:
generate or receive a message comprising paging assistance information; and
transmit the message comprising the paging assistance information toward an access network (AN) node, wherein
the paging assistance information comprises paging priority information, and
the message comprising the paging assistance information is a UE context modification message configured to cause the AN node to add the paging priority information to an established UE context associated with the UE.

15. The CP node according to claim 14, wherein the paging assistance information comprises a paging priority value.

16. The CP node according to claim 14, wherein
the UE is in Radio Resource Control inactive state, or
the UE is in Connection Management Connected state with RRC inactive state.

17. An Access Network (AN) node, the AN comprising:
memory; and
processing circuitry coupled to the memory, wherein the AN node is configured to:
receive a message transmitted by a Control plane (CP) node, wherein the message comprises paging assistance information;
determine a paging strategy based on the received paging assistance information; and
page a User Equipment (UE) using the determined paging strategy, wherein
the paging assistance information comprises paging priority information, and
the message comprising the paging assistance information is a UE context modification message configured to cause the AN node to add the paging priority information to an established UE context associated with the UE.

18. A computer program product comprising a non-transitory computer readable medium storing a computer program comprising instructions which, when executed on at least one processor, cause the at least one processor to carry out a method comprising:
generating or receiving a message comprising paging assistance information; and
transmitting the message comprising the paging assistance information toward an access network (AN) node, wherein
the paging assistance information comprises paging priority information that indicates an importance of downlink signalling for a UE,
the message comprising the paging assistance information is a UE context modification message configured to cause the AN node to add the paging priority information to an established UE context associated with the UE, and
the method further comprises:
the AN node receiving the message transmitted by the CP node;
the AN determining a paging strategy based on the paging assistance information included in the received message; and
the AN paging a User Equipment (UE) using the determined paging strategy.

19. A method, the method comprising:
a control plane (CP) node generating a message comprising paging assistance information; and
the CP node transmitting the message comprising the paging assistance information toward an access network (AN) node, wherein
the paging assistance information comprises at least one of service priority information and/or paging priority information,
the message is a UE context request message for causing the AN node to establish a UE context associated with a UE or at least partly modify an established UE context associated with the UE,
the UE context request message comprises paging assistance information comprising a service priority value indicating an importance of downlink signalling, and
the UE context request message is configured to cause the AN node to modify the established UE context associated with the UE to include the paging assistance information.

* * * * *

UNITED STATES PATENT AND TRADEMARK OFFICE
CERTIFICATE OF CORRECTION

PATENT NO. : 11,729,742 B2  
APPLICATION NO. : 16/753717  
DATED : August 15, 2023  
INVENTOR(S) : Chen et al.

Page 1 of 1

It is certified that error appears in the above-identified patent and that said Letters Patent is hereby corrected as shown below:

On the Title Page

On Page 2, in Item (56), under "OTHER PUBLICATIONS", in Column 2, Line 18, delete "Comm" and insert -- Content --, therefor.

On Page 2, in Item (56), under "OTHER PUBLICATIONS", in Column 2, Line 27, delete "Huawel" and insert -- Huawei --, therefor.

In the Drawings

In Fig. 4, Sheet 4 of 8, and on the title page, the illustrative print figure, Tag "401.", Line 2, delete "e.g.to" and insert -- e.g. to --, therefor.

In Fig. 7, Sheet 7 of 8, Tag "701.", Line 3, delete "node." and insert -- node --, therefor.

In the Specification

In Column 1, Line 9, delete "filed Oct." and insert -- filed on Oct. --, therefor.

In Column 2, Line 28, delete "function the" and insert -- function of the --, therefor.

In Column 7, Line 64, delete "described seen" and insert -- seen --, therefor.

In Column 7, Line 67, delete "handing" and insert -- handling --, therefor.

In Column 9, Line 29, delete "described seen" and insert -- seen --, therefor.

In Column 9, Line 32, delete "handing" and insert -- handling --, therefor.

In Column 12, Line 56, delete "(105" and insert -- (105) --, therefor.

Signed and Sealed this  
Twenty-eighth Day of November, 2023

Katherine Kelly Vidal  
*Director of the United States Patent and Trademark Office*